United States Patent [19]
Greig

[11] Patent Number: 4,515,103
[45] Date of Patent: May 7, 1985

[54] APPARATUS FOR COATING A TIRE TREAD

[76] Inventor: Robert E. Greig, 911 Imperial Palm Dr., Largo, Fla. 33541

[21] Appl. No.: 546,449

[22] Filed: Oct. 28, 1983

Related U.S. Application Data

[63] Continuation-in-part of Ser. No. 343,406, Jan. 28, 1982, abandoned.

[51] Int. Cl.$^3$ .......................... B05C 1/02; B05C 19/00
[52] U.S. Cl. .................................. 118/218; 118/225; 118/233; 118/232; 118/257
[58] Field of Search ............... 118/218, 232, 233, 304, 118/225, 257, 223

[56] References Cited

U.S. PATENT DOCUMENTS

| | | | |
|---|---|---|---|
| 370,396 | 9/1887 | Jeffery | 118/233 X |
| 2,425,332 | 8/1947 | Langdon | 118/304 X |
| 2,490,921 | 12/1949 | Rousseau | 118/232 X |
| 3,389,009 | 6/1968 | McNulty et al. | 156/187 X |

FOREIGN PATENT DOCUMENTS 626825 10/1978 U.S.S.R. ............................... 118/218

Primary Examiner—John P. McIntosh
Attorney, Agent, or Firm—Ronald E. Smith

[57] ABSTRACT

Footwear, tires and apparatus for manufacturing the same. The articles have untreated traction grooves formed therein and friction-providing surfaces contiguous to said traction grooves. Apparatuses for producing the respective articles include a fiberglass mat or equivalent upon which adhesives and abrasives are embedded on sandpaper manufacturing equipment and further includes a piercing cut out means the cuts out footwear soles from the treated mat to suit design. Apparatus for producing tires having traction and friction surfaces is housed within a pit or well so that a vehicle may be driven into position thereatop so that such apparatus may treat the vehicles tires as desired by harnessing the weight of the vehicle to achieve the desired embedding.

3 Claims, 6 Drawing Figures

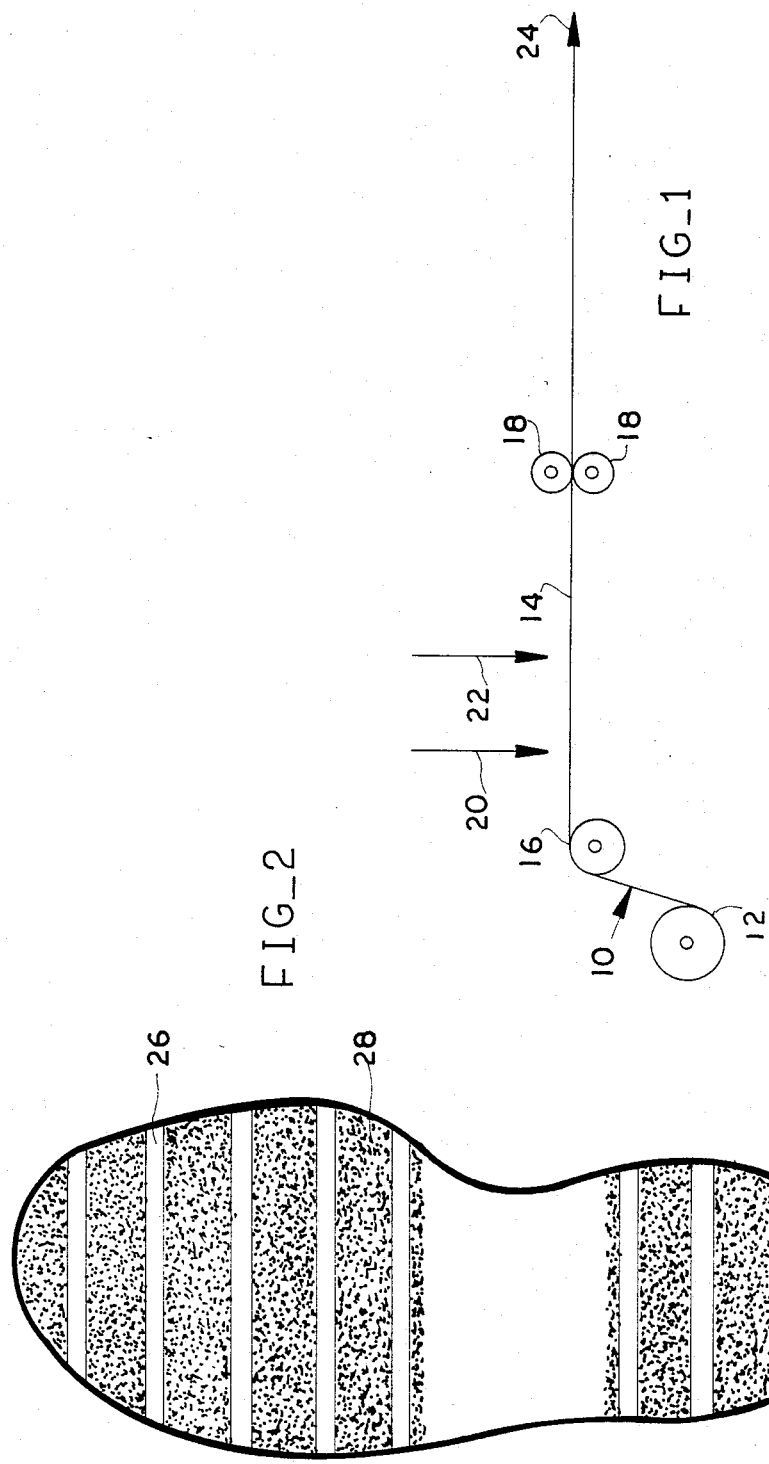

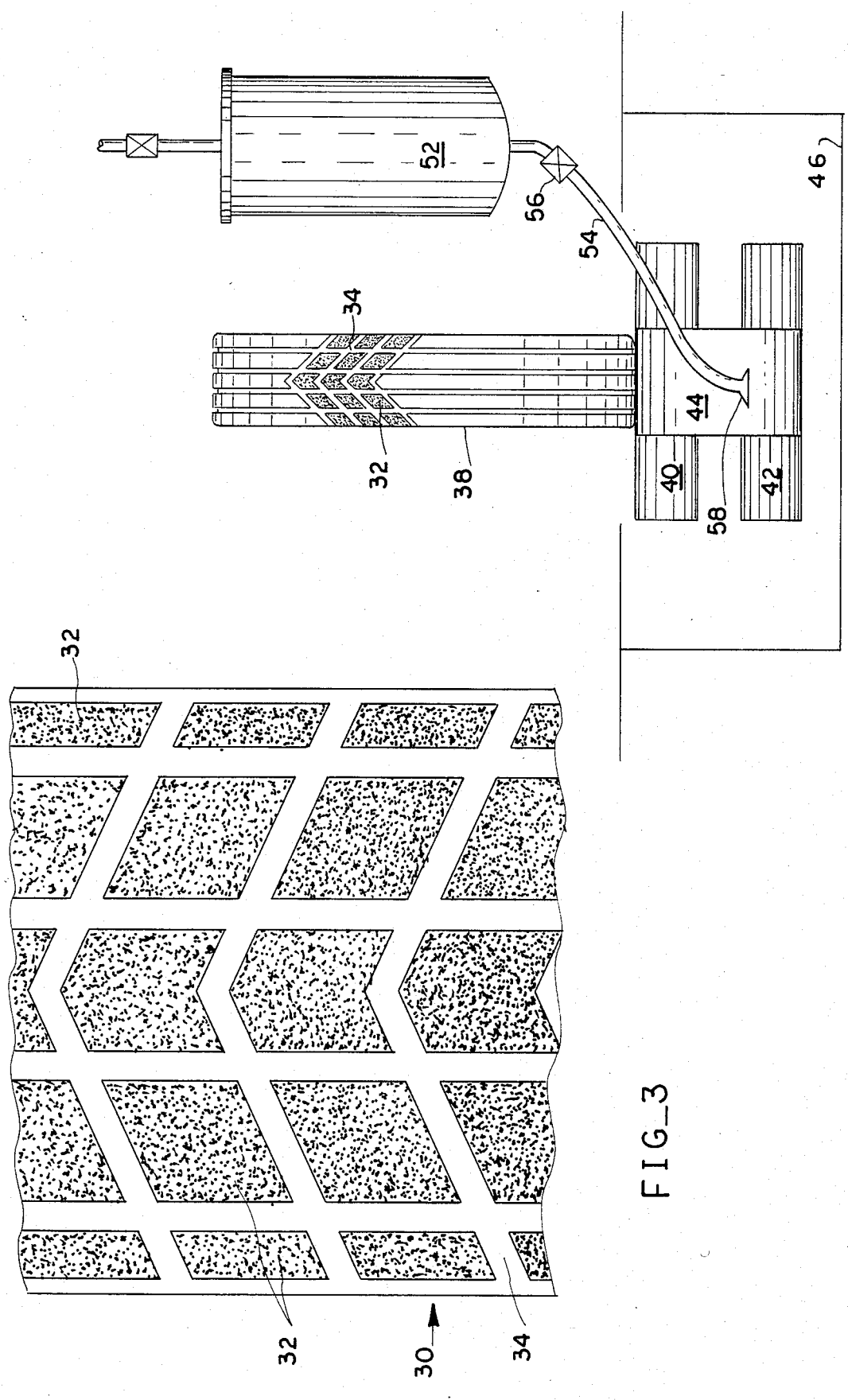

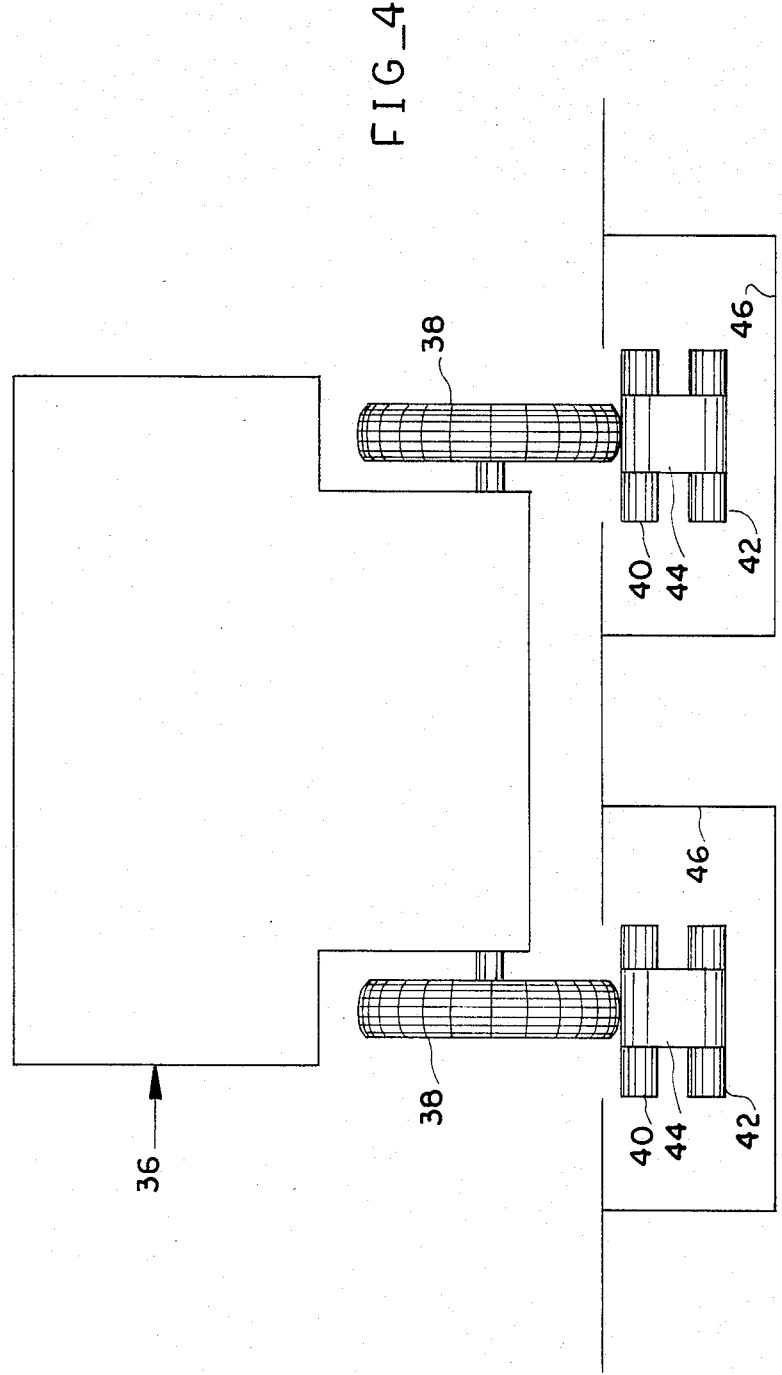

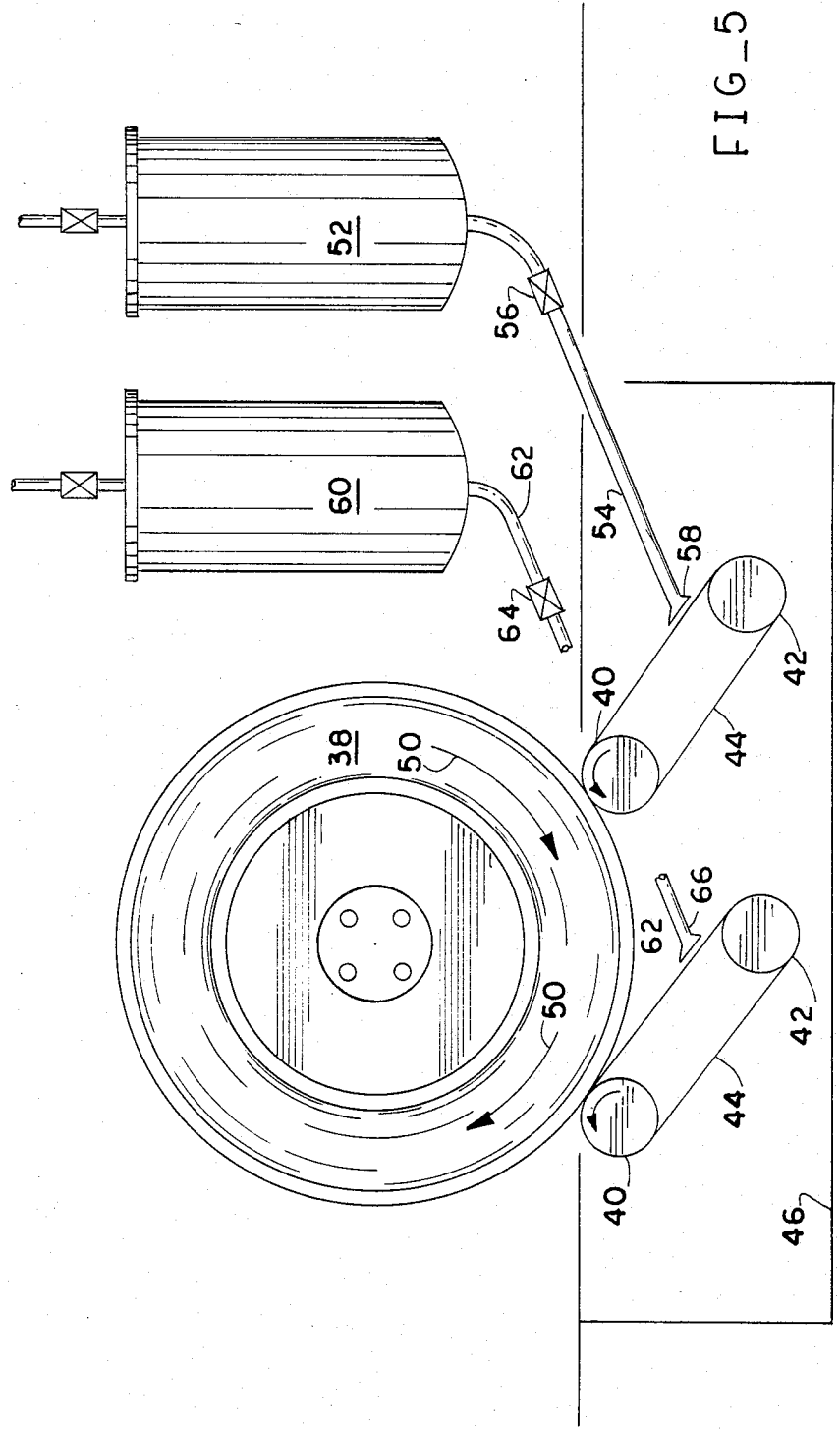
FIG_5

APPARATUS FOR COATING A TIRE TREAD

CROSS-REFERENCE TO RELATED APPLICATIONS

This disclosure is a continuation-in-part of co-opening disclosure bearing Ser. No. 343,406, filed Jan. 28, 1982 now abandoned.

BACKGROUND OF THE INVENTION

1. Field of the Invention

This invention relates, generally, to articles of manufacture of the type that grip road or street surfaces and the apparatuses for producing the same, and more specifically relates to a footwear sole having friction and traction surfaces and an apparatus for producing such sole, together with a tire tread having both friction and traction surfaces, and apparatus for making the same.

2. Description of the Prior Art

U.S. Pat. No. 1,679,272 to F. A. Schultz, issued July 31, 1928, shows a shoe sole that has been modified to include a plurality of open pockets within which are disposed means that project therefrom to produce a tread grip. The projecting means have no enhanced friction-providing surfaces.

J. S. Porter, in U.S. Pat. No. 1,775,110, dated Sept. 9, 1930, discloses an apparatus suitable for applying abrasive to polishing wheels. The apparatus includes an endless belt that provides communication between the wheel to be treated and a hopper that stores the abrasive prior to application.

U.S. Pat. No. 3,227,200 to A. Andy, issued Jan. 4, 1966, entitled "Anti-Skid Tread for Vehicle Tires" shows a tire construction wherein particles of undissolved styrene of irregular shape are embedded in a pneumatic tire. The friction and traction surfaces of the Andy tire are treated with such particulate. The disclosure does not show specific apparatus for making the tire, nor, like all of the known prior art disclosures, does it show or suggest a means that would allow retention of the traction feature of the tire after the road-gripping surface thereof has been treated.

F. A. Clark, in U.S. Pat. No. 3,276,501, dated Oct. 4, 1966, also shows an anti-skid tire that has embedded therein abrasive granules such as cinder or sand granules. No specific apparatus for producing the desired tire is shown.

U.S. Pat. No. 3,389,009 to F. E. McNulty, et. al., issued June 18, 1968, shows a method of coating conduits with a protective layer or coating of finely powdered resin particles.

The art is devoid of teachings or suggestions concerning how to provide shoe soles having both traction and friction surfaces. The art also provides no apparatus suitable for quickly and effectively applying friction-enhancing particles to the non-traction surfaces of a vehicle tire. Very importantly, the art contains no disclosures showing articles of manufacture or apparatus for making such articles of the type that retain the quality of traction after the friction quality has been enhanced.

The novel apparatus for applying friction-enhancing particles to the road-contacting portion of vehicle tires while leaving the non-road contacting, or traction portions thereof in an untreated condition, includes apparatus that is disposed below a road surface so that a vehicle may be driven into position atop such apparatus when it is desired to treat the tires of the vehicle. The sunken disposition of the novel apparatus enables the weight of the vehicle to be employed to accomplish the embedding of particulate matter into the adhesive applied by such sunken apparatus.

It is therefore seen that the primary object of this invention is to provide articles of manufacture that exhibit enhanced surface-gripping qualities due to their having friction-enhanced and traction surfaces.

Another object is to show apparatuses of the type suitable for making the inventive articles.

Still another object is to provide such apparatuses in practical form so that the inventive articles of manufacture can be mass produced so as to be affordable to consumers.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For fuller understanding of the nature and objects of the invention, reference should be made to the following detailed description, taken in connection with the accompanying drawings, in which:

FIG. 1 is a diagram, in side elevational view, of sandpaper manufacturing equipment that has been modified to accept a fiberglass mat or equivalent material as a substrate upon which adhesive and abrasives are sequentially deposited for subsequent embedding by a roller means.

FIG. 2 is a diagram of a shoe sole or other type of footwear sole produced by the apparatus depicted in FIG. 1.

FIG. 3 is a diagram of a tire tread that depicts its enhanced friction-providing surfaces as shaded areas, and that depicts its recessed, traction-providing surfaces as unshaded areas.

FIG. 4 is a diagram, in front or rear elevational view, of a vehicle that has been driven atop the novel apparatus for applying adhesives and abrasives on its tires, wherein said novel apparatus is depicted within a pit or well formed within a support surface.

FIG. 5 is a diagram, in side elevational view, showing a tire supported by the novel apparatus contained within one of the pits.

FIG. 6 is a diagram, in front or rear elevational view, of the apparatus wherein some parts have been eliminated to simplify the view.

Similar reference numerals refer to similar parts throughout the several views of the drawings.

DETAILED DESCRIPTION OF THE PREFERRED EMBODIMENT

A fiberglass mat or other suitable, essentially equivalent material, is denoted by the reference numeral 10 in FIG. 1. The mat 10 is unwound from a roll 12 where large quantities thereof are provided so that the process of making the inventive footwear is virtually continuous and uninterrupted. The unrolled mat 10 enters a preferably level, horizontally disposed section, indicated generally as 14, defined between longitudinally spaced roller members 16, 18 where adhesive means of innumerable possible varieties are applied thereto, and where abrasive means of innumerable possible varieties are subsequently applied thereto. For illustrative purposes, the deposition of adhesives upon the mat 10 is indicated by arrow 20, and the deposition of abrasives is indicated by arrow 22.

Roller member 18 includes a set of members as shown and as is clearly depicted, the adhesive and abrasive-carrying mat 10 is passed therebetween as the mat 10 is unrolled from roll 12 in the direction indicated by arrow 24. The passing of mat 10 between rollers 18 serves to embed the particulate-in-form abrasives into the adhesives and into the mat itself to produce the desired structure.

FIG. 2 shows a footwear sole formed from the mat 10 and the adhesives and abrasives embedded therein by the novel apparatus shown in FIG. 1. Worthy of note is the fact that the traction portions 26 thereof, having utility on soft surfaces, remain in their pristine condition-only the street-gripping surfaces 28 of the sole are provided with friction-enhancing particles.

In a similar fashion, a tire tread 30 is shown in FIG. 3 having friction-enhanced road-contacting surfaces 32 and untreated, recessed traction-providing surfaces 34 for soft surfaces.

Attention is now directed to FIG. 4 where a vehicle 36 is shown having wheels 38. Each wheel 38, 38 is shown disposed in supported relation atop a cylindrical in configuration roller member 40, 40 having a width sufficient to accommodate vehicles of differing widths. The vehicle 36 shown in FIG. 4 has a width such that its tires 38 are disposed centrally of the roller members 40, but it should be understood that the width of such roller members 40 allows the same to accommodate subcompact automobiles as well as wide track motor vehicles.

Disposed downwardly of roller members 40 is a substantially identical set of rollers 42, 42. The upper and lower rollers members 40, 42 are interconnected by belt members 44, 44 as is shown in FIG. 4. Both sets of roller members 40, 42, as well as belts 44, are disposed within a pit means 46 formed in the support surface 48. In a contemplated embodiment of the invention, support surface 48 is a garage floor of the type typically found in service stations having repair services available from a mechanic or a staff of mechanics.

The details of the apparatus shown diagrammatically in FIG. 4 are perhaps seen better in FIG. 5, where a tire 38 is shown rotating in a clockwise direction as indicated by arrows 50. For an engine-driven wheel, the motor vehicle's engine could be employed to effect such rotation, whereas for a non-driven wheel, belts 44, 44 can be driven by suitable means. In either situation, adhesives are delivered from hopper 52 to belt 44 via hose 54 having a flow control valve 56 provided therein. A discharge nozzle 58 provided at the distal free end of hose 54 performs the application of the adhesive to the belt in a spray pattern of sufficient width (see FIG. 6) to suitably cover such belt 44. Similarly, as is also shown in FIG. 5, abrasives in particulate form are delivered from hopper 60 to belt 44 via hose 62 having flow control valve 64 provided therein. Nozzle member 66 discharges the particulate matter in an appropriate pattern on its associated belt 44. The adhesive, being applied first, will bond the subsequently applied abrasives to the tire road-contacting surface only, leaving the recessed traction-providing surfaces thereof in their original condition. The weight of the vehicle will embed the particles into the adhesive as desired.

Clearly, both footwear and tires can be provided with enhanced friction-providing surfaces while maintaining their original traction-providing surfaces in accordance with the teachings of this invention. Suitable apparatus for manufacturing the inventive articles of manufacture have been shown and described. In view of such disclosure, those skilled in the art of machine design will be cognizant of a number of variations that could be employed in machinery that could produce the inventive articles. Such variations to the novel apparatuses disclosed herein as are obvious in view of this disclosure to those of ordinary skill in the art are within the purview of this invention. It is critical to note, moreover, that the products of the invention disclosed herein retain their traction qualities even after their friction quality has been improved. This is in sharp and distinctive contrast with the constructions of the prior art.

It will thus be seen that the objects set forth above, and those made apparent by the preceding description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, that which is claimed is:

1. An apparatus for improving the friction-related and traction-related qualities of a tire having a tread formed by raised, road-contacting surfaces and depressed, non-road contacting surfaces, comprising, a pit formed in a support surface, a first pair of vertically spaced roller members comprising an upper roller member and a lower roller member, a first belt member disposed in interconnecting relation between said first pair of upper and lower roller members, a second pair of vertically spaced roller members comprising an upper roller member and a lower roller member, a second belt member disposed in interconnecting relation between said second pair of upper and lower roller members, said first and second pairs of roller members longitudinally spaced from one another by a distance sufficient to accommodate therebetween a vehicle tire, said first and second pairs of roller members disposed within said pit so that the respective upper roller members of said first and second pair of roller members are positioned substantially coplanar with said support surface, said vehicle tire contacting said first and second belt members at circumferentially spaced contact-regions thereon, a first reservoir member for the storage of an adhesive, said first reservoir member adapted to discharge said adhesive at preselected rates of discharge onto said first belt member at a point intermediate said first pair of upper and lower roller members, a second reservoir member for the storage of particulate, said second reservoir member adapted to discharge said particulate at preselected rates onto said second belt member at a point intermediate said second pair of upper and lower roller members, said first and second belt members positioned so that their axes of rotation are parallel to the axis of rotation of the tire, and a common belt-rotation means to impart unidirectional and uniform rate rotation to said first and second belt members so that adhesive is applied to said tire by said first belt member and so that said particulate is applied to said tire by said second belt member subsequent to said adhesive application.

2. The apparatus of claim 1, wherein the first and second belt members respectively interconnecting said first and second pair of upper and lower roller members are disposed in substantially parallel relation to one another.

3. The apparatus of claim 2, further comprising a first nozzle member associated with said first belt member and a second nozzle member associated with said second belt member, said respective nozzle members confluent with their respective reservoir members and positioned to deposit the respective contents of the reservoir members on said respective belt members at a point intermediate the respective upper and lower roller members of said pairs of upper and lower roller members.

* * * * *